US012609485B2

(12) United States Patent
Mahajanshetty et al.

(10) Patent No.: US 12,609,485 B2
(45) Date of Patent: Apr. 21, 2026

(54) HIGH POWER CONNECTOR

(71) Applicant: MOLEX, LLC, Lisle, IL (US)

(72) Inventors: Shivasharan Mahajanshetty, Bengaluru (IN); Rachel Low, LaGrange, IL (US); Jeffrey Joniak, Homer Glen, IL (US)

(73) Assignee: Molex, LLC, Lisle, IL (US)

( * ) Notice: Subject to any disclaimer, the term of this patent is extended or adjusted under 35 U.S.C. 154(b) by 376 days.

(21) Appl. No.: 18/566,113

(22) PCT Filed: Jun. 28, 2021

(86) PCT No.: PCT/IB2021/055762
§ 371 (c)(1),
(2) Date: Dec. 1, 2023

(87) PCT Pub. No.: WO2023/275587
PCT Pub. Date: Jan. 5, 2023

(65) Prior Publication Data

US 2024/0250473 A1 Jul. 25, 2024

(30) Foreign Application Priority Data

Jun. 28, 2021 (IN) ............................ 202141028852

(51) Int. Cl.
*H01R 13/627* (2006.01)
*H01R 13/506* (2006.01)

(52) U.S. Cl.
CPC ....... *H01R 13/6275* (2013.01); *H01R 13/506* (2013.01)

(58) Field of Classification Search
CPC .......................... H01R 13/6275; H01R 13/506
USPC ........................................................ 439/345
See application file for complete search history.

(56) References Cited

U.S. PATENT DOCUMENTS 4,191,440 A 3/1980 Schramm
4,961,711 A * 10/1990 Fujiura .................. H01R 12/75 439/357
5,011,439 A 4/1991 Pawlicki
(Continued)

FOREIGN PATENT DOCUMENTS

CN 2757377 Y 2/2006
CN 104348027 A 2/2015
(Continued)

OTHER PUBLICATIONS

International Preliminary Report on Patentability received for PCT Application No. PCT/IB2021/055762, mailed on Jan. 11, 2024, 5 pages.
(Continued)

*Primary Examiner* — Harshad C Patel

(57) ABSTRACT

A connector is configured to be mounted to first and second electrical components. The connector includes an insulative housing having latches which can be pressed into a pressed condition, and a conductive body and a lock mounted within the housing. The body has engagements configured to be coupled to the electrical components. The lock is in contact with the latches and is movable therewith when the latches are pressed. The lock engages with a coupling pin of one of the electrical components to secure the electrical component to the connector.

20 Claims, 11 Drawing Sheets

(56) References Cited

U.S. PATENT DOCUMENTS

| | | | | | |
|---|---|---|---|---|---|
| 5,941,726 | A * | 8/1999 | Koegel | H01R 13/6275 439/354 |
| 6,945,666 | B2 * | 9/2005 | Woolfson | G01P 3/40 362/208 |
| 8,840,435 | B2 * | 9/2014 | Plazio | H01R 13/502 439/607.41 |
| 10,978,829 | B2 * | 4/2021 | Wimmer | H01R 13/506 |
| 11,196,202 | B2 * | 12/2021 | Hua | H01R 13/2407 |
| 11,329,427 | B2 * | 5/2022 | Ichikawa | H01R 13/6273 |
| 11,569,612 | B2 * | 1/2023 | Wang | H01R 13/502 |
| 12,334,675 | B2 * | 6/2025 | Pritz | H01R 13/639 |
| 2002/0019178 | A1 | 2/2002 | Fukuda | |
| 2003/0203658 | A1 | 10/2003 | Zhao | |
| 2015/0031225 | A1 * | 1/2015 | Oh | H01R 11/282 439/304 |
| 2016/0308304 | A1 * | 10/2016 | Miller | H01R 13/20 |
| 2018/0212360 | A1 * | 7/2018 | Motohashi | H01R 13/6583 |
| 2020/0403343 | A1 * | 12/2020 | Bronk | H01R 13/6315 |
| 2023/0033815 | A1 * | 2/2023 | Horning | H01R 13/6275 |
| 2023/0115610 | A1 * | 4/2023 | Horning | H01R 13/20 439/347 |

FOREIGN PATENT DOCUMENTS

| | | | |
|---|---|---|---|
| CN | 103124013 | B | 3/2016 |
| CN | 207265337 | U | 4/2018 |
| DE | 102010005833 | A1 | 9/2011 |
| EP | 1447882 | A1 | 8/2004 |
| EP | 1635424 | A2 | 3/2006 |
| EP | 1998410 | A1 | 12/2008 |
| JP | H08148227 | A | 6/1996 |
| JP | H09330698 | A | 12/1997 |
| JP | H11185878 | A | 7/1999 |
| JP | 2019533284 | A | 11/2019 |
| JP | 2021047999 | A | 3/2021 |
| TW | 528237 | U | 4/2003 |
| TW | I287335 | B | 2/2005 |
| TW | 201509020 | A | 3/2015 |
| WO | 2019081151 | A1 | 5/2019 |
| WO | 2021013003 | A1 | 1/2021 |

OTHER PUBLICATIONS

International Search Report and Written Opinion received for PCT Application No. PCT/IB2021/055762, mailed on Mar. 16, 2022, 8 pages.

TE Connectivity, "RAPID LOCK* Single-Pole Quick-Connect/Disconnect Bus Bar Connectors", Application Specification 114-64005, Rev B, Nov. 25, 2016, 10 pages.

TE Connectivity, "Snap-Lug, Quick Disconnect Power Connector", Application Specification 114-32130, Rev Tentative A, Jun. 3, 2016, 11 pages.

* cited by examiner

HIGH POWER CONNECTOR

RELATED APPLICATION

This application is a U.S. National Phase Patent Application of International Patent Application No. PCT/IB2021/055762, filed on Jun. 28, 2021, which claims priority to Indian Patent Application number 202141028852 filed on Jun. 28, 2021, both of which are incorporated herein by reference in their entireties.

FIELD OF THE DISCLOSURE

This disclosure relates to the field of connectors, more specifically to high power connectors.

DESCRIPTION OF RELATED ART

High power connectors are typically used in connections between electrical components. A circular female socket receives a male pin for making the electrical connection. The male pin is generally crimped to a wire. A single pair of connectors, a supply connector and a return connector, are typically used. In some instances, ganged or multiple pin/socket pairs are used that provide more power.

BRIEF SUMMARY

According to an embodiment of the disclosure, a connector is configured to be mounted to first and second electrical components. The connector includes an insulative housing having latches which can be pressed into a pressed condition, and a conductive body and a lock mounted within the housing. The body has engagements configured to be coupled to the electrical components. The lock is in contact with the latches and is movable therewith when the latches are pressed. The lock engages with a coupling pin of one of the electrical components to secure the electrical component to the connector.

To better understand the above-described objectives, characteristics and advantages of the present disclosure, embodiments, with reference to the drawings, are provided for detailed explanations.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
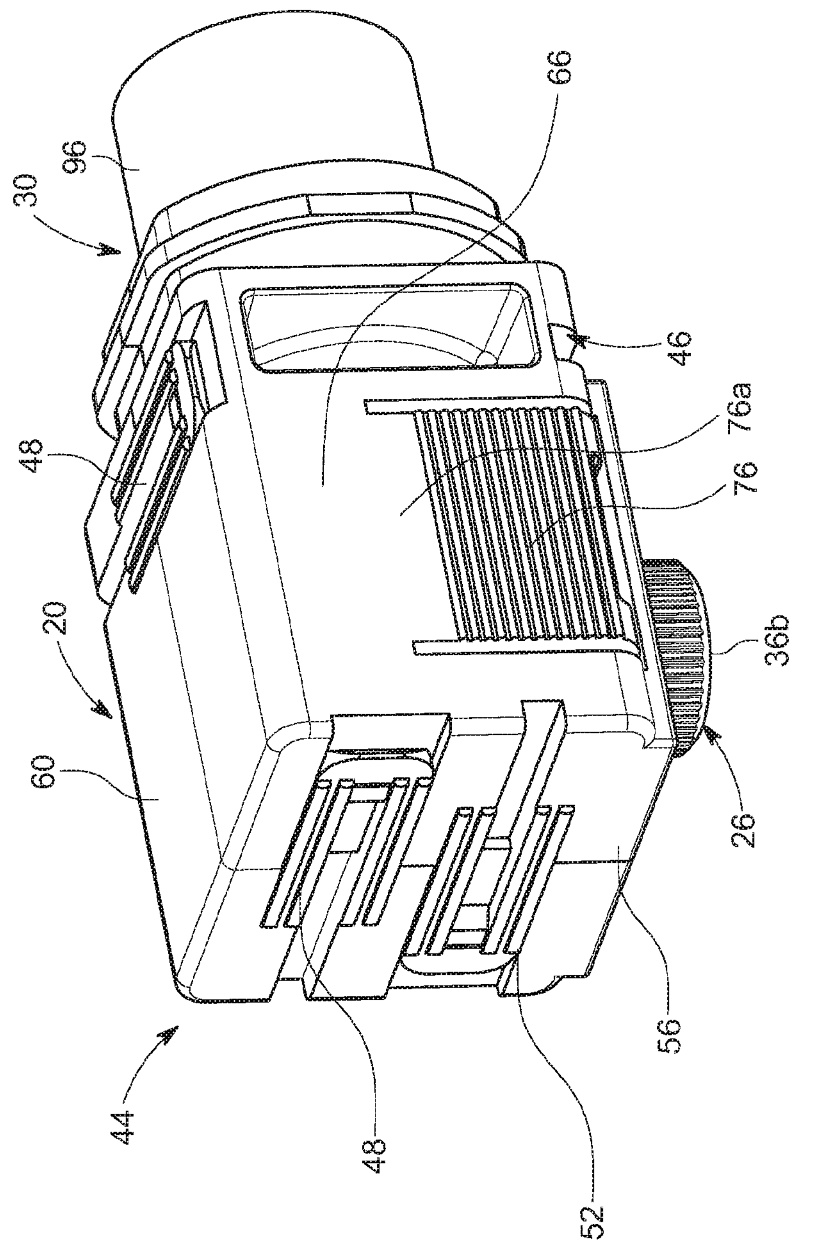
FIG. 1 depicts a top perspective view of an embodiment of a connector and a coupling pin mated therewith.
Figure 2:
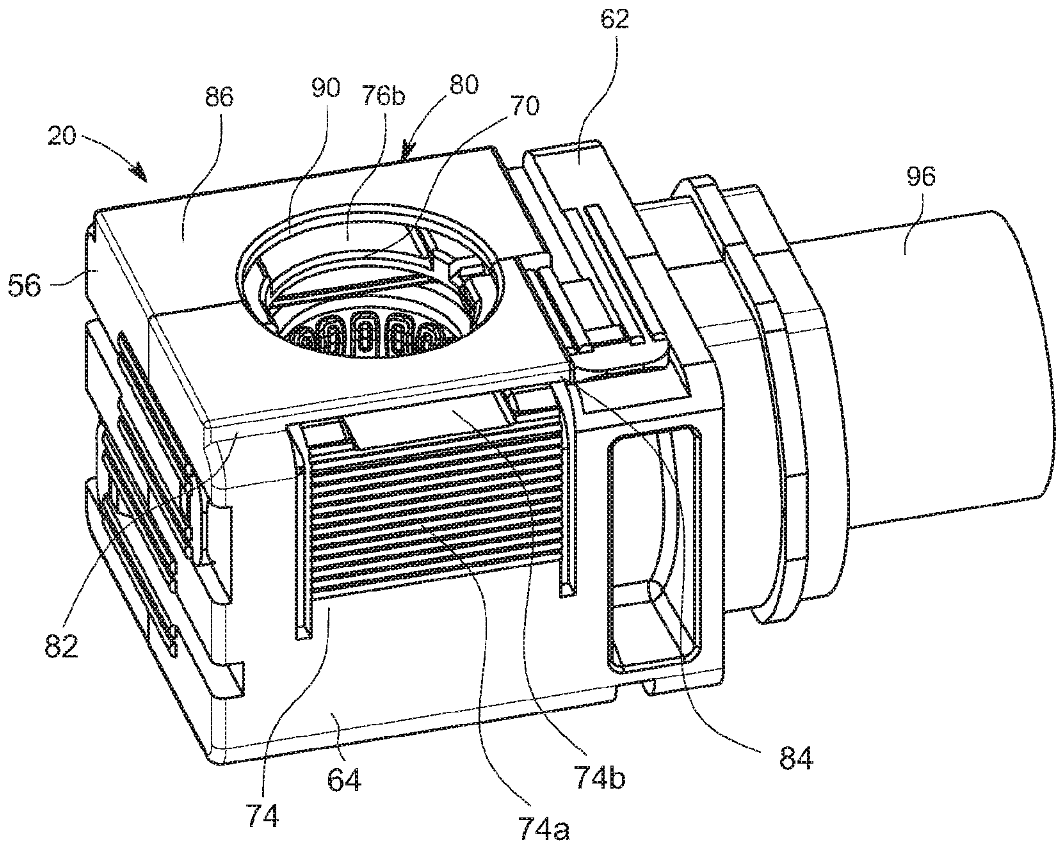
FIG. 2 depicts a bottom perspective view of the connector.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Directional terms such as top, upper, bottom, lower, vertical and the like are used for ease in explanation, and do not denote a required orientation in use.

Figure 3:
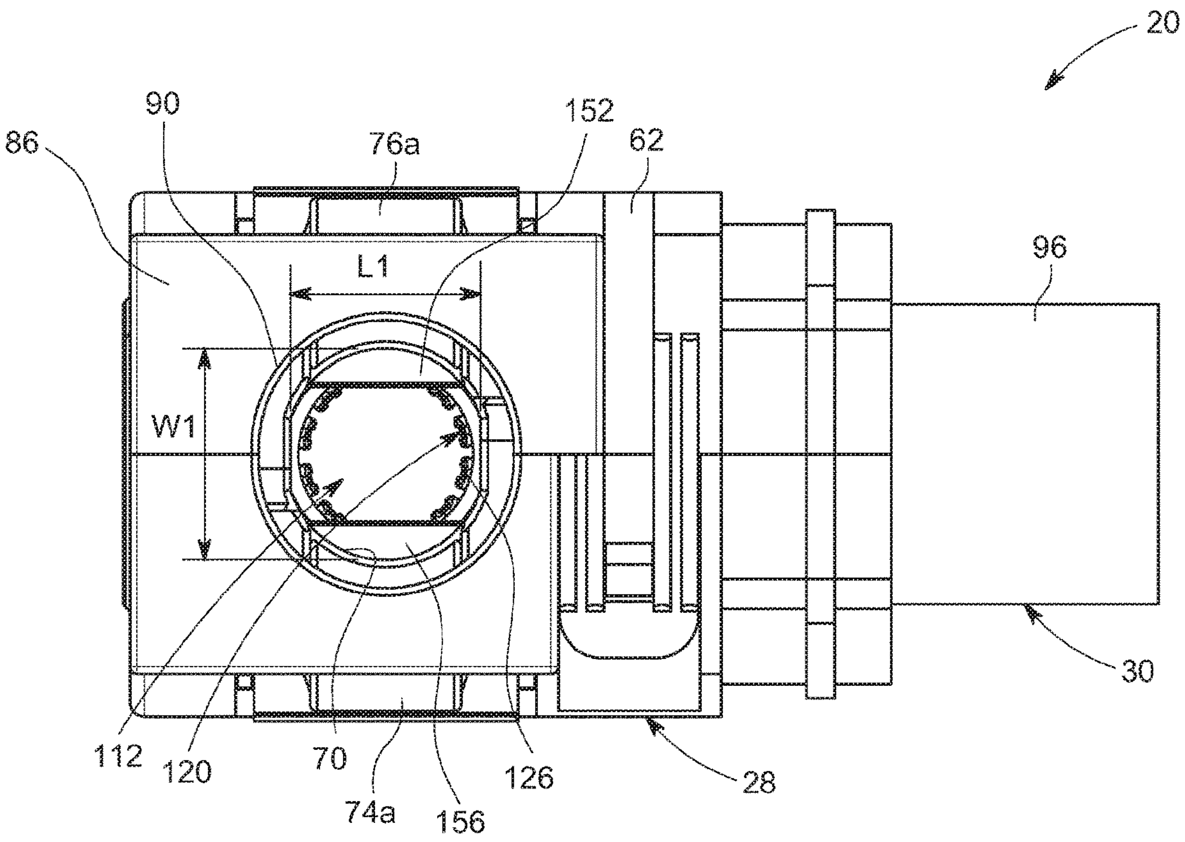
FIG. 3 depicts a bottom plan view of the connector.
Figure 5:
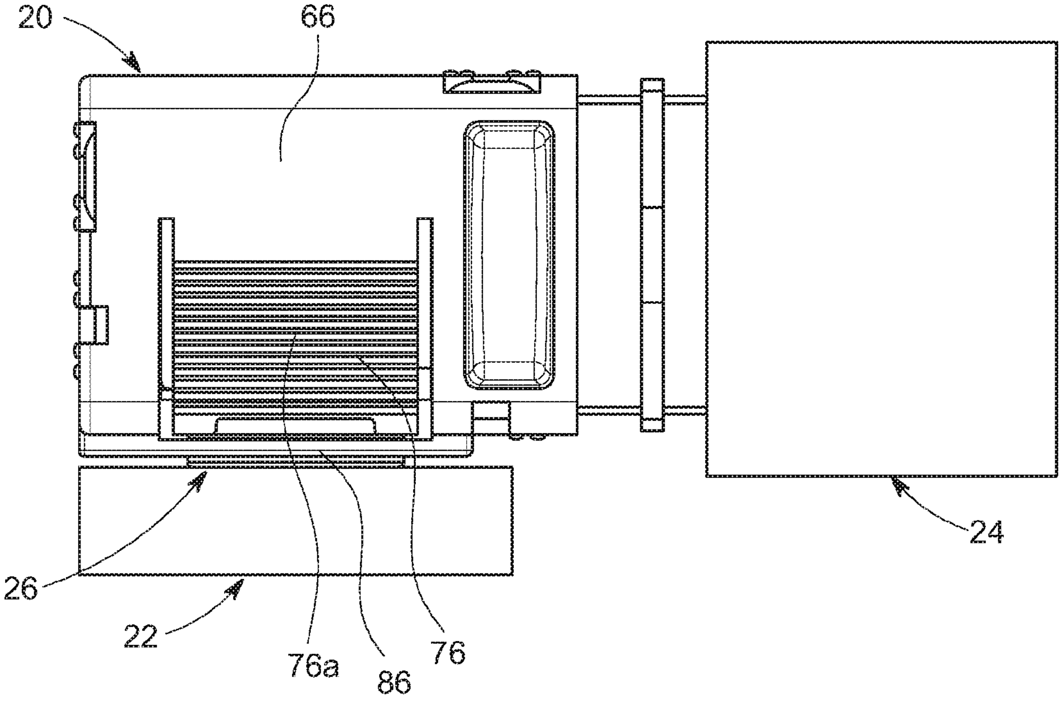
FIG. 5 depicts a side elevation view of the connector, with the coupling pin mated therewith, and first and second electrical components, and shown from the front.

A high power connector 20, see FIGS. 1, 3 and 5, is provided for mating a first electrical component 22 to a second electrical component 24. The electrical components 22, 24 may be busbars or printed circuit boards, and the like. The connector 20 provides for a low profile assembly and provides an operator with the ability to easily and quickly assemble the connector 20 with the first electrical component 22 and release the connector 20 from the first electrical component 22. The features providing the release are ergonomic. A conductive coupling pin 26 extends from the first electrical component 22 and electrically couples to the connector 20 when inserted therein.

The connector 20 includes an insulative housing 28, a conductive body 30 mounted within the housing 28 which is configured to be electrically coupled to the electrical components 22, 24, and a lock 32 mounted within the housing 28 which releasably locks the coupling pin 26 and the first electrical component 22 to the connector 20.

The first electrical component 22 is conventional and may be rigid with an elongated and substantially rectangular-shaped body having opposite planar surfaces. The coupling pin 26 may seat within an opening 34 in the first electrical component 22 to couple the coupling pin 26 to the first electrical component 22 and may be secured thereto by a press fit. Alternately, the coupling pin 26 may be coupled to the first electrical component 22 by a screw attachment, or by surface mounting, and the like. In the embodiment shown in the drawings, see FIG. 6, the coupling pin 26 has a cylindrical portion 36 having first and second ends **36*a*. 36*b*, a flange 38 which extends radially outward from the cylindrical portion 36 proximate to, but spaced from, the second end 36*b* thereof, and an undercut or groove 40 which extends circumferentially around the cylindrical portion 36. The groove 40 is between the first end 36*a* and the flange 38. In an embodiment, the second end 36*b* of the coupling pin 26 has a plurality of teeth 42 thereon which bite into the first electrical component 22 when the second end 36*b* of the coupling pin 26 is inserted into the opening 34 in the first electrical component 22 to provide for a press fit mounting. The first end 36*a* of the coupling pin 26** may be rounded or spherical.

Figure 4:
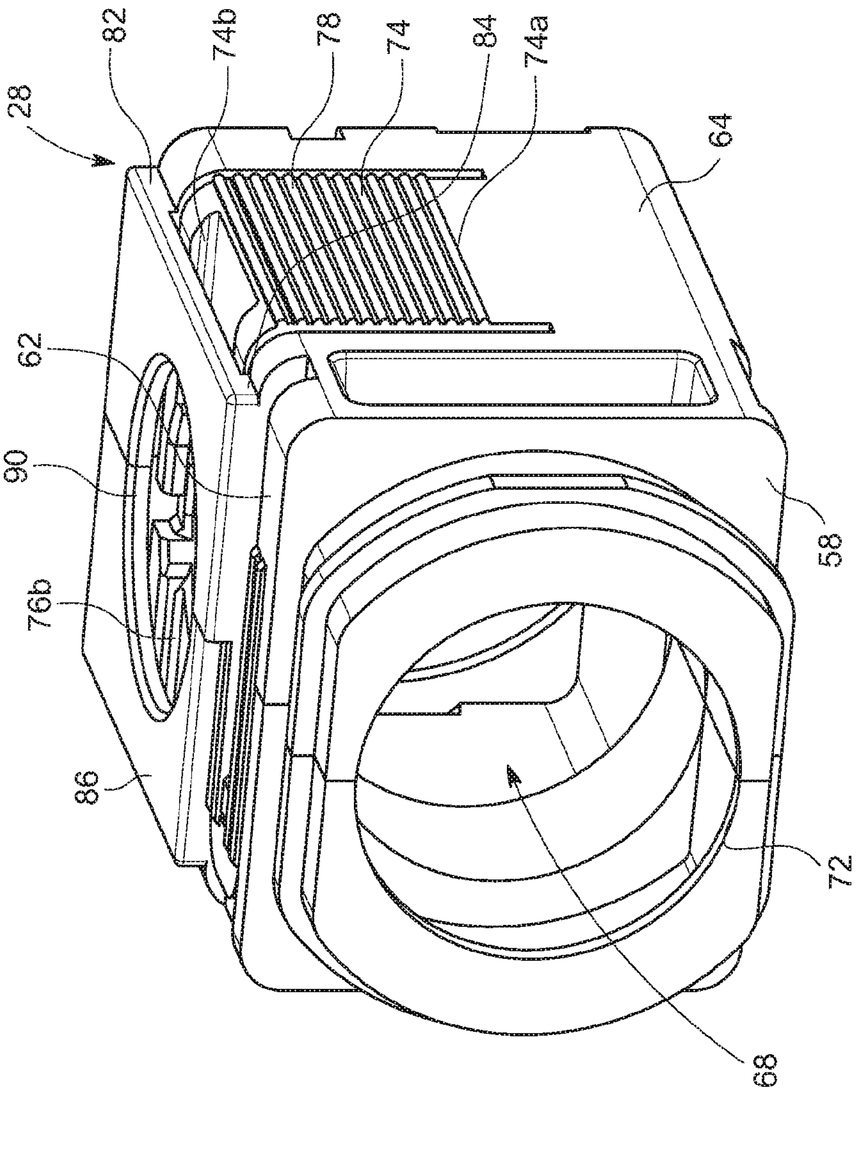
FIG. 4 depicts a bottom perspective view of a housing of the connector, shown from the rear.
Figure 6:
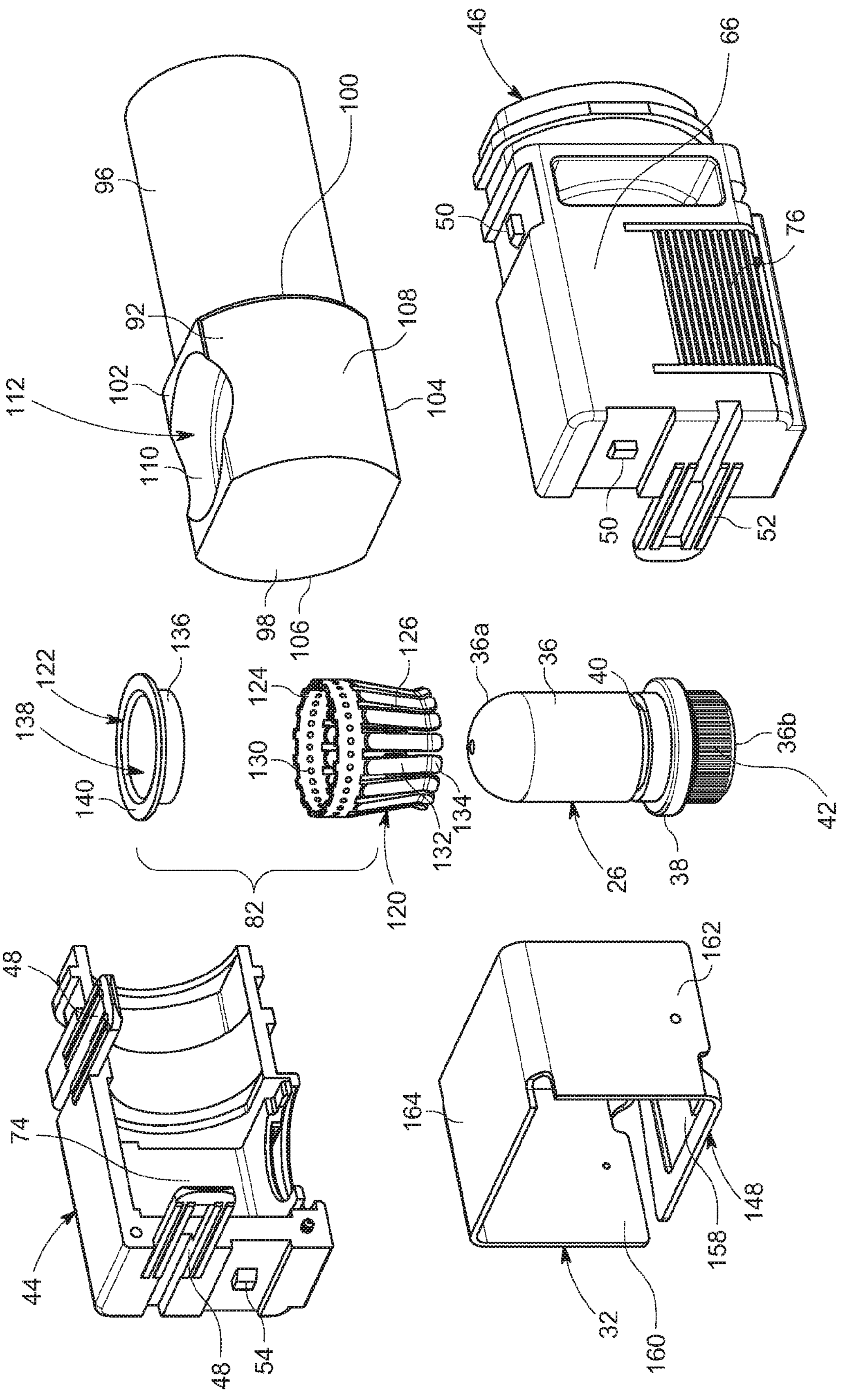
FIG. 6 depicts an exploded perspective view of the connector.

As shown in FIGS. 4 and 6, the housing 28 has first and second housing parts 44, 46 which are mated together. In an embodiment, the housing parts 44, 46 are snap fit together by first arms 48 on the first housing part 44 which engage with first barbs 50 on the second housing part 46 and by second arms 52 on the second housing part 46 which engage with second barbs 54 on the first housing part 44. Other means for mating the housing parts 44, 46 together are within the scope of the present disclosure. When the housing parts 44, 46 are mated together, opposing front and rear walls 56, 58 are coupled together by opposing top and bottom walls 60, 62 and opposing side walls 64, 66. The housing 28 has a passageway 68 provided therethrough which extends from a first opening 70 in the bottom of the housing 28 as described further herein to a second opening 72 in the rear wall 58 as shown, or in the front wall 56 or in the top wall 60. The second opening 72 is smaller than the passageway 68. In the embodiment shown, the passageway 68 is L-shaped such that a right-angle connector is provided, however, a linear passageway 68 is provided when the second opening 72 is in the top wall 60.

Each side wall 64, 66 has a latch 74, 76 which can be pressed into a pressed condition in the passageway 68 and inwardly relative to the remainder of the respective side wall 64, 66 under pressure by an operator. Each latch 74, 76 has a first wall portion 74*a*, 76*a* which is fixed to the remainder of the respective side wall 64, 66 and which is spaced from the top wall 60, and second wall portion 74*b*, 76*b* which is perpendicular to the first wall portion 74*a*, 76*b*. When the latches 74, 76 are not in the pressed condition, the first wall portions 74*a*, 76*a* are parallel to the side walls 64, 66, and the second wall portions 74*b*, 76*b* are parallel to the bottom wall 62. The ends of the second wall portions 74*b*, 76*b* of the latches 74, 76 face each other, but are spaced apart from each other, and define the first opening 70 therebetween. The first opening 70 may be circular. A width W1 of the first opening 70 is defined in the direction between the side walls 64, 66, and a length L1 of the first opening 70 is defined in the direction between the front and rear walls 56, 58. The first opening 70 is smaller than the passageway 68. Each first portion 74*a*, 76*a* of the latches 74, 76 may have a plurality of ribs 78 on its external surface to provide a visual indicator to the operator where to press on the latch 74, 76.

Figure 10:
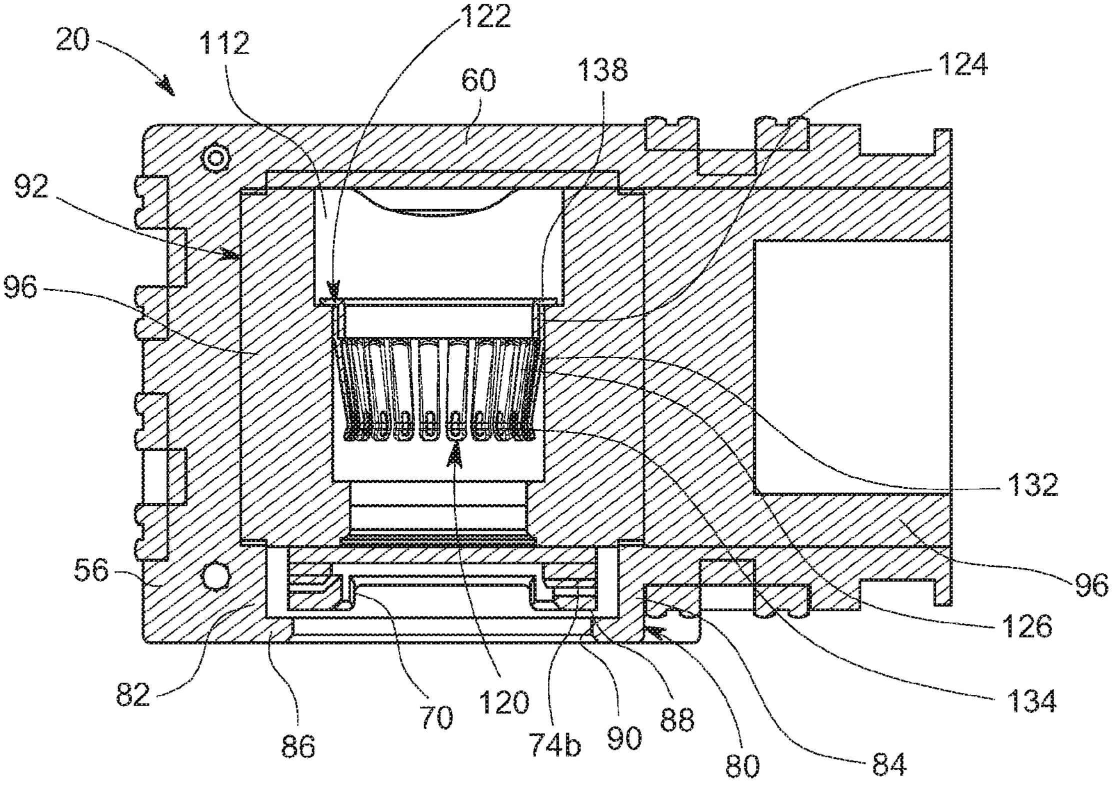
Figure 11:
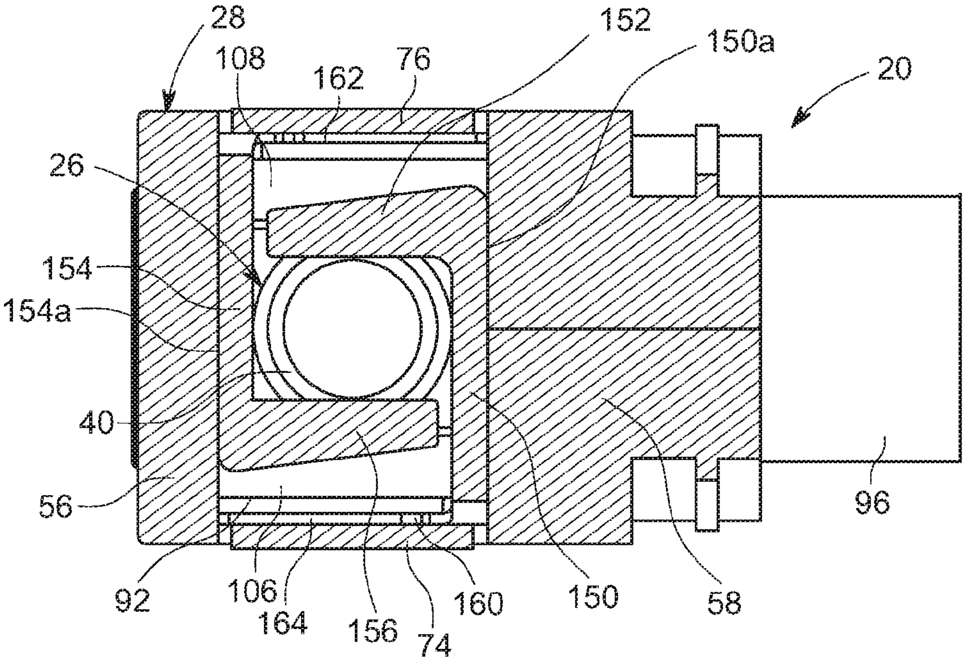

When the housing parts 44, 46 are mated together, a bridge 80 is provided on the bottom wall 62 and extends over the second wall portions 74*b*, 76*b* of the latches 74, 76, see FIG. 10. The bridge 80 has a front vertical wall portion 82 which is proximate to the front wall 56 and extends between the side walls 64, 66, a rear vertical wall portion 84 which is proximate to the rear wall 58 and extends between the side walls 64, 66, and a lower wall portion 86 which extends between the lower ends of the front and rear wall portions 82, 84 and extends between the side walls 64, 66. The front and rear wall portions 82, 84 are parallel to each other and are perpendicular to the first wall portions 74*a*, 76*a* of the latches 74, 76. The lower wall portion 86 is parallel to, but spaced from, from the second wall portions 74*b*, 76*b* of the latches 74, 76 such that a space 88 is provided therebetween. In an embodiment, the space 88 is 0.25 mm. The lower wall portion has an opening 90 therethrough which aligns with the opening 70, but has a diameter which is larger than the opening 70.

As shown in FIG. 6, the body 30 has a barrel 92, a first engagement 94 coupled to the first electrical component 22, and a second engagement 96 coupled to the second electrical component 24.

In the embodiment as shown which is adapted for forming a right-angle connector, the barrel 92 has opposing front and rear wall surfaces 98, 100 which are coupled together by opposing top and bottom wall surfaces 102, 104 and opposing side wall surfaces 106, 108. A wall 110 forming a passageway 112 extends from the bottom wall surface 104, and may be open to the top wall surface 102. The passageway 112 has an upper portion 114 which extends from the top wall surface 102 to a lower portion 116 which extends to the bottom wall surface 104. The upper portion 114 has a diameter that is larger than the diameter of the lower portion 116 such that an upper wall 118 is defined by the upper portion 114. A centerline CL of the passageway 112 is provided between ends thereof. In an embodiment, the barrel 92 is a cylinder truncated on its upper and lower ends.

In an embodiment and as shown, the first engagement 94 includes a contact 120 which is separately formed from the barrel 92 and secured to the barrel 92 by a cap 122. The contact 120 has a generally hollow shape which generally conforms to the shape of the inner surface of the wall 110 forming the passageway 112 in the barrel 92. The contact 120 may be formed of an alloy with gold plating. In an embodiment, the contact 120 is formed from a ring-like connecting portion 124 having a plurality of separate flexible beams 126 cantilevered therefrom such that a passageway 128 is formed therein which extends from an upper end of the contact 120 to a bottom end of the contact 120. A centerline of the contact 120 is provided between the ends. In an embodiment, the connecting portion 124 is discontinuous around its circumference such that a slot is provided. The connecting portion 124 has a plurality of spaced apart inwardly extending protrusions 130 and outwardly extending protrusions 130 provided thereon which may be aligned around the circumference of the connecting portion 124. The inwardly and outwardly extending protrusions 130 may alternate between a protrusion extending outwardly from the outer surface of the connecting portion 124 and a protrusion extending inwardly from the inner surface of the connecting portion 124. The beams 126 extend from the lower end of the connecting portion 124. Each beam 126 is parallel to, and radially spaced from, the centerline of the contact 120. The beams 126 are spaced apart from each other around the circumference of the connecting portion 124. In an embodiment, each beam 126 has a first portion 132 which extends at an angle from the connecting portion 124 at a corner, and a second portion 134 which extends at an angle from an end of the first portion 132 at a corner. The first portion 132 angles inwardly toward the centerline of the contact 120, and the second portion 134 angles outwardly from the centerline of the contact 120. The corners between the first and second portions 132, 134 may be radiused. In an embodiment, the corners between the first and second portions 132, 134 are aligned around the circumference of the contact 120 and define an inner diameter. The inner diameter defined by the corners between the first and second portions 132, 134 is less than the diameter of the cylindrical portion 36 of the coupling pin 26. The contact 120 may be stamped out of a flat sheet of material and rolled into the shape. The contact 120 may be machined into the shape.

In an embodiment, the cap 122 has an annular lower wall 136 which defines a central passageway 138, and an upper wall 140 extending radially outwardly from and perpendicular to the lower wall 136.

The contact 120 is seated within the lower portion 116 of the passageway 112 in the barrel 92 such that the upper and lower ends of the contact 120 do not protrude from the upper and lower ends of the barrel 92. The centerline CL of the passageway 112 and the centerline of the contact 120 align. The ends of the second portion 134 of the beams 126 are spaced from the wall surface forming the lower portion 116 of the passageway 112. The outer surface of the connecting portion 124 is proximate to the inner surface of the wall 110 forming the lower portion 116 and the outwardly extending protrusions 130 abut against the inner surface of the wall 110 forming the lower portion 116. The cap 122 secures the barrel 92 and the contact 120 together. In an embodiment, the cap 122 is press fit to the barrel 92 and to the contact 120. In an embodiment, the cap 122 is crimped to the barrel 92 and to the contact 120. The wall 136 of the cap 122 engages against the inwardly extending protrusions 130 of the contact 120 and has a diameter which is greater than a diameter defined by the inwardly extending protrusions 130. When the wall 136 of the cap 122 is engaged with the connecting portion 124, the protrusions 130 are deformed to secure the contact 120 to the barrel 92. The upper wall 140 is seated within the upper portion 114 of the passageway 112 in the barrel 92 and engages the upper wall 118.

Other first engagements are within the scope of the present disclosure.

The second engagement 96 may be formed as a crimp body that is crimped to wires of a cable (not shown) coupled to the second electrical component 24, may be soldered, welded, screw attached and the like. In some embodiments, the second engagement 96 has a plurality of flexible beams like that provided for the first engagement 94 which mate with a pin extending from the second electrical component 24. In some embodiments, the second engagement 96 is a pin that is inserted into a plated via or surface mounted to a contact pad of the second electrical component 24.

Figure 9:
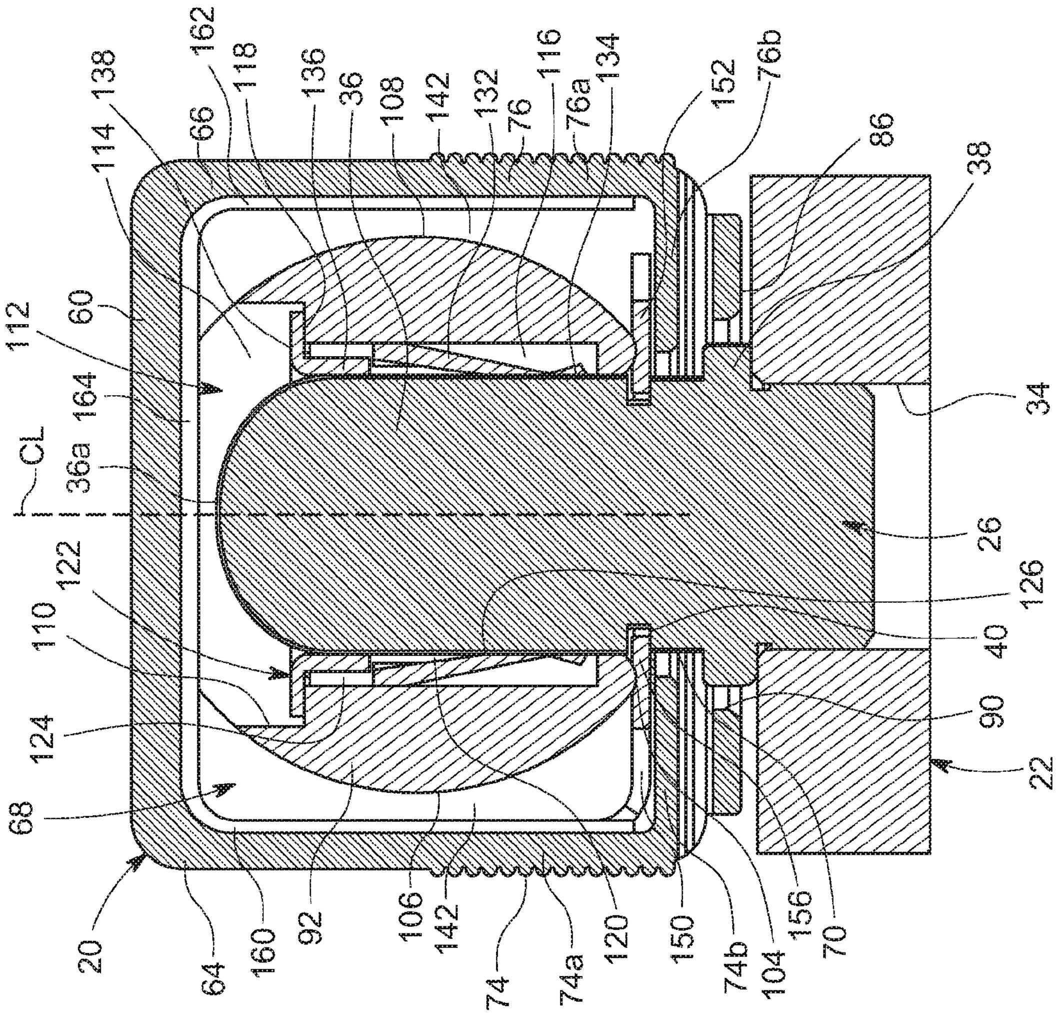
FIGS. 9-11 depict cross-sectional views of the connector.

As shown in FIG. 9, the barrel 92 seats within the passageway 68 in the housing 28 and contacts the top wall 60 and is spaced from the bottom wall 62. The side wall surfaces 106, 108 are spaced from the first wall portions 74*a*, 74*b* of the latches 74, 76 by gaps 142. The openings 70, 90 aligns with the passageway 112 and are proximate to a lower end of the lower portion 116. The centerline CL of the passageway 112 and the centerline of the contact 120 align with a centerlines of the openings 70, 90. The second engagement 96 extends through the second opening 72 and outwardly of the rear wall 58 of the housing 28.

Figure 7:
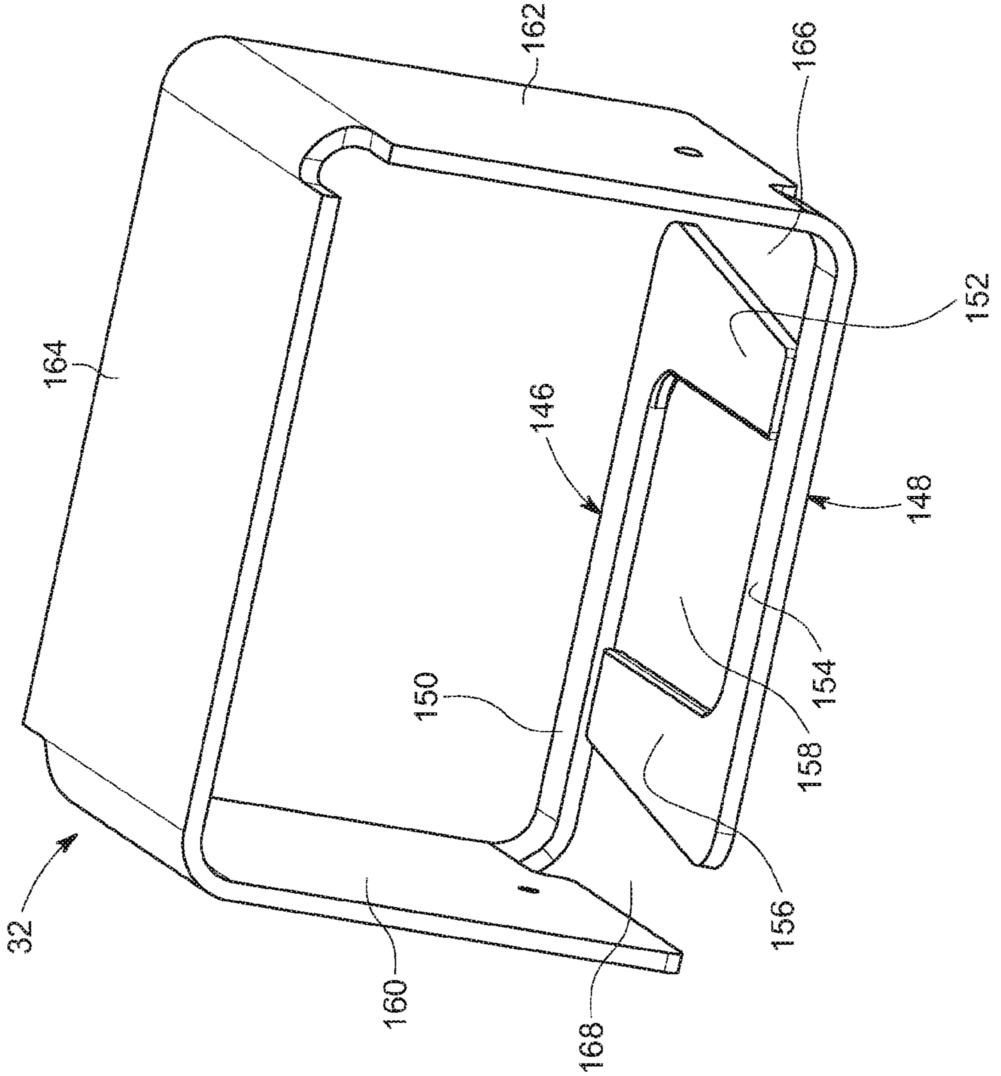
FIG. 7 depicts a perspective view of a lock of the connector.
Figure 8:
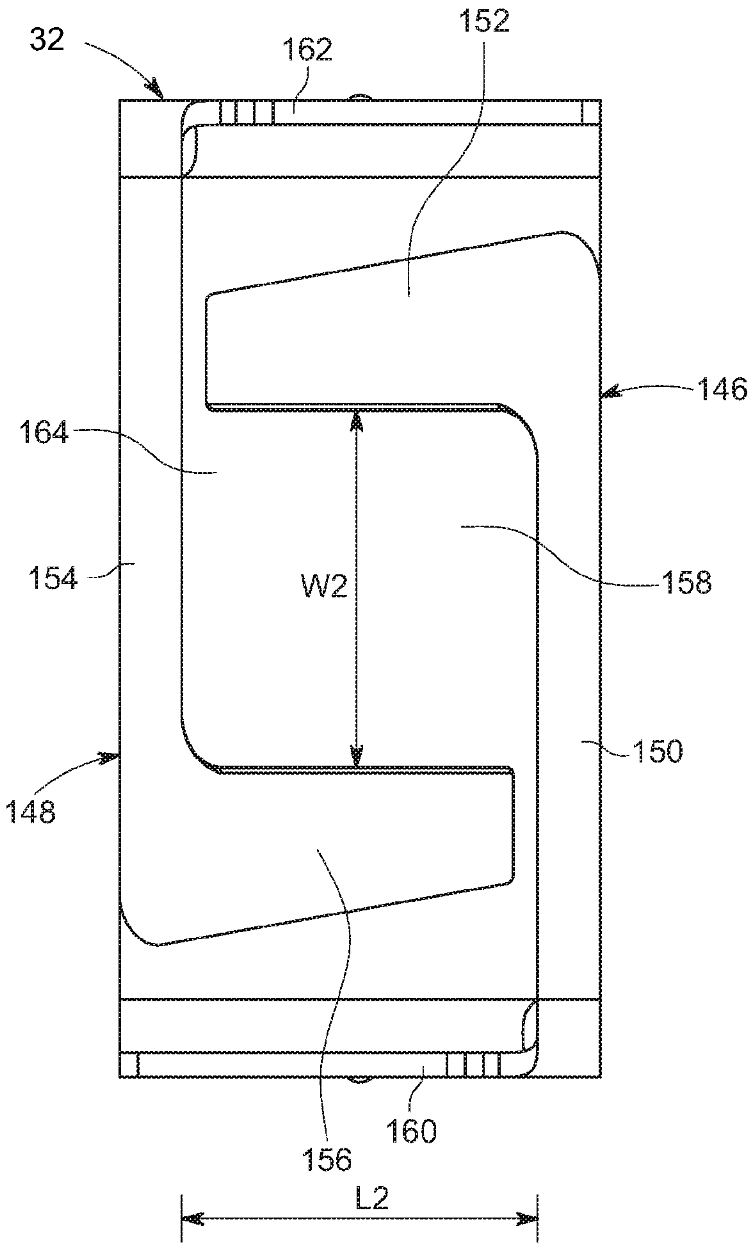
FIG. 8 depicts a bottom plan view of the lock.

As shown in FIGS. 6-8, the lock 32 has a first lock wall 146 and a second lock wall 148.148 The first lock wall 146 has a first arm portion 150 and a second arm portion 152 extending from an end of the first arm portion 150. The arm portions 150, 152 are generally perpendicular to each other and form an L-shape. The second lock wall 148 has a first arm portion 154 and a second arm portion 156 extending from an end of the first arm portion 154. The arm portions 154, 156 are generally perpendicular to each other and form an L-shape. The end of the arm portion 152 is proximate to arm portion 154, and the end of the arm portion 156 is proximate to arm portion 150. The arm portions 150, 152, 154, 156 preferably fall in the same plane and form a receiving opening 158 configured to receive the cylindrical portion 36 of the coupling pin 26 therethrough. A width W2 of the receiving opening 158 is defined between the second arm portions 152, 156, and a length L2 of the receiving opening 158 is defined between the second arm portions 150, 154. The first lock wall 146 is in contact with the first latch 74 and movable therewith when the first latch 74 is pressed into the passageway 68, and the second lock wall 148 in is contact with the second latch 76 and movable therewith when the second latch 76 is pressed into the passageway 68. The first arm portion 150 extends from an inner surface of the first wall portion 74*a* of the first latch 74, and the second arm portion 152 is in contact with an upper surface of the second wall portion 74*b* of the first latch 74. The first arm portion 154 extends from an inner surface of the first wall portion 76*a* of the second latch 76, and the second arm portion 156 is in contact with an upper surface of the second wall portion 76*b* of the second latch 76. In the embodiment as shown, the lock 32 further includes a third lock wall 160 extending from, and perpendicular to, the first lock wall 146, a fourth lock wall 162 extending from, and perpendicular to, the second lock wall 148, and a fifth lock wall 164 which is perpendicular to and extends between the third and fourth lock walls 160, 162. The third and fourth lock walls 160, 162 are parallel to each other. The fifth lock wall 164 is opposite to, and parallel to, the first and second lock walls 146, 148. The first, second, third, fourth and fifth lock walls 146, 148, 160, 162, 164 form a box-shape having open front and rear ends. The outer end of the second arm portion 152 is proximate to, but spaced from, the fourth lock wall 162 by a gap 166, and the outer end of the second arm portion 156 is proximate to, but spaced from, the third lock wall 160 by a gap 166. The lock 32 may be stamped and formed out a sheet of metal, such as stainless steel. The lock 32 may be formed out of plastic.

As shown in FIG. 9, the lock 32 is seated within the passageway 68 with the receiving opening 158 aligning with, and proximate to, the first opening 70 and aligning with the opening 90. The lock 32 surrounds the barrel 92. The first and second lock walls 146, 148 are parallel to, but spaced from, the bottom wall 62 of the housing 28. Additionally, the first and second lock walls 146, 148 are proximate to the bottom wall surface 104 of the barrel 92, and may abut against the bottom wall surface 104 of the barrel 92. A rear end 150*a* of the first arm portion 150 of the first lock wall 146 abuts against the inner surface of the rear wall of the passageway 68 formed by the rear wall 58 of the housing 28. A front end 154*a* of the first arm portion 154 of the second lock wall 148 abuts against the inner surface of the front wall of the passageway 68 formed by the front wall 56 of the housing 28. The third lock wall 160 abuts against an inner surface of the first wall portion 74*a* of the first latch 74, and is proximate to, but spaced from the side wall surface 106 of the barrel 92 by the gap 142. The fourth lock wall 162 abuts against an inner surface of the first wall portion 76*a* of the second latch 76, and is proximate to, but spaced from the side wall surface 108 of the barrel 92 by the gap 142. The fifth lock wall 164 is proximate to, and abuts against, a lower surface of the top wall 60. When the latches 74, 76 are not in the pressed condition, the width W2 of the receiving opening 158 is less than the width W1 of the first opening 70 and the length L2 of the receiving opening 158 is greater than or equal to the length L1 of the first opening 70.

When the latch 74 is pressed inwardly into the passageway 68, the third lock wall 160 and the first lock wall 146 are moved toward the side wall 66. The engagement of the first arm portion 150 with the rear wall 58 constrains the movement the third lock wall 160 and the first lock wall 146 so that the third lock wall 160 and the first lock wall 146 only move toward the side wall 66. Likewise, when the latch 76 is pressed is pressed inwardly into the passageway 68, the fourth lock wall 162 and the second lock wall 148 are moved toward the side wall 64. The engagement of the first arm portion 154 with the front wall 56 constrains the movement the fourth lock wall 162 and the second lock wall 148 so that the fourth lock wall 162 and the second lock wall 148 only move toward the side wall 64. The length L2 of the receiving opening 158 does not change. Therefore, when both latches 74, 76 are pressed, the second arm portions 152, 156 move away from each other, thereby increasing the width W2 of the receiving opening 158. In some embodiments, a gap may be provided between the first arm portion 150 and the rear wall 58 and/or the first arm portion 154 and the front wall 56 to allow some movement of the first arm portions 150, 154 under this movement.

The coupling pin 26 can be quickly and easily attached to the connector 20 and released from the connector 20 without the use of tools. To couple the coupling pin 26 to the connector 20, the first end 36*a* of the cylindrical portion 36 of the coupling pin 26 is inserted through the opening 90 and then through the first opening 70 of the housing 28, through the receiving opening 158 of the lock 32, and into the contact 120. The cylindrical portion 36 has a diameter which is greater than the width W2 of the receiving opening 158 when the latches 74, 76 are not in the pressed condition and slightly less than the length L2 of the of the receiving opening 158 when the latches 74, 76 are not in the pressed condition. When the first end 36*a* contacts the second arm portions 152, 156 of the first and second lock walls 146, 148, the second arm portions 152, 156 move away from each other, thereby increasing the width W2 of the receiving opening 158. The rounded or spherical shape of the first end 36*a* provides a lead-in for the coupling pin 26. This will cause the latches 74, 76 to move slightly outward from the side walls 64, 66. The cylindrical portion 36 engages with the beams 126, which causes the beams 126 to flex outward from the centerline CL of the passageway 112. This ensures an electrical connection between the coupling pin 26 and the contact 120. The coupling pin 26 is inserted into the housing 28 until the flange 38 seats within the opening 90. At this position, the groove 40 aligns with the second arm portions 152, 156, and the latches 74, 76 resume their unpressed condition which causes the second arm portions 152, 156 to move toward each other to decrease the width W2 of the receiving opening 158 and seat within the groove 40. This prevents the coupling pin 26 from being readily pulled out from the connector 20. The bridge 80 controls the lift of the first and second lock walls 146, 148, and improves the retention force of the latches 74, 76 while maintaining the low profile of the connector 20. The dimension of the space 88 controls the deflection of the latches 74, 76.

The coupling pin 26 can be quickly and easily released from the connector 20 by the operator pressing the latches 74, 76 into the passageway 68. When the latches 74, 76 are pressed inwardly into the passageway 68, the third lock wall 160 and the first lock wall 146 are moved toward the side wall 66, and the fourth lock wall 162 and the second lock wall 148 are moved toward the side wall 64, thereby increasing the width W2 of the receiving opening 158. This moves the second arm portions 152, 156 out of the groove 40. The operator can then easily pull the coupling pin 26 out of the connector 20.

In an alternate embodiment, the fifth lock wall 164 of the lock 32 is not provided and the rear ends of the third and fourth lock walls 160, 162 are secured to the latches 74, 76 of the housing 28. In yet another alternate embodiment, the third, fourth and fifth lock walls 160, 162, 164 of the lock 32 are eliminated and the first lock wall 146 is affixed to the first latch 74 and the second lock wall 148 is affixed to the second latch 76. The receiving opening 158 aligns with and is proximate to the first opening 70.

In some embodiments, the wall which is proximate to the first end 36*a* of the coupling pin 26 when the coupling pin 26 is seated in the connector 20 has an opening (not shown) therethrough.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. Further, the foregoing descriptions describe methods that recite the performance of a number of steps. Unless stated to the contrary, one or more steps within a method may not be required, one or more steps may be performed in a different order than as described, and one or more steps may be formed substantially contemporaneously. Finally, the drawings are not necessarily drawn to scale.

We claim:

1. A connector configured to be mounted to first and second electrical components, comprising:

an insulative housing having a plurality of walls defining a passageway therethrough and terminating in first and second openings, a first latch is associated with a first one of the walls, and a second latch is associated with a second one of the walls, wherein each latch can be moved into the passageway into a pressed condition;

a conductive body mounted within the housing, the conductive body having a first engagement configured to couple the conductive body to the first electrical component and a second engagement configured to couple the conductive body to the second electrical component, the first engagement being aligned with the first opening, and the second engagement being aligned with the second opening; and a lock mounted in the passageway, the lock having a first lock wall in contact with the first latch and movable therewith when the first latch is pressed into the passageway, and a second lock wall in contact with the second latch and movable therewith when the second latch is pressed into the passageway, each lock wall having a first arm portion extending from the respective latch and a second arm portion extending from the first arm portion, the arm portions forming a receiving opening configured to receive the first electrical component therethrough, the receiving opening being proximate to the first opening, and wherein the receiving opening has a dimension which is less than the first opening when the latches are not in the pressed condition.

2. The connector of claim 1, in combination with a coupling pin, the coupling pin comprising a body portion having a groove therein, wherein the first and second lock walls are configured to seat within the groove.

3. The connector of claim 1, wherein the first arm portion is perpendicular to the second arm portion in each lock wall.

4. The connector of claim 3, in combination with a coupling pin, the coupling pin comprising a body portion having a groove therein, wherein the first and second lock walls are configured to seat within the groove.

5. The connector of claim 3, wherein the lock further includes a third lock wall extending from the first lock wall, the third lock wall abutting against the first latch, a fourth lock wall extending from the second lock wall, the fourth lock wall abutting against the second latch, and a fifth lock wall extending between the third and fourth lock walls.

6. The connector of claim 5, wherein the lock is stamped and formed of steel.

7. The connector of claim 5, wherein the lock partially surrounds the conductive body.

8. The connector of claim 5, wherein the lock is formed of plastic.

9. The connector of claim 1, wherein the lock further includes a third lock wall extending from the first lock wall, the third lock wall abutting against the first latch, a fourth lock wall extending from the second lock wall, the fourth lock wall abutting against the second latch, and a fifth lock wall extending between the third and fourth lock walls.

10. The connector of claim 9, in combination with a coupling pin, the coupling pin comprising a body portion having a groove therein, wherein the first and second lock walls are configured to seat within the groove.

11. The connector of claim 9, wherein the lock partially surrounds the conductive body.

12. The connector of claim 1, wherein the first engagement comprises a plurality of spaced apart beams cantilevered from a portion of the conductive body, each beam having a first portion extending from the portion of the conductive body and a second portion extending from the first portion, the second portion being angled relative to the first portion.

13. The connector of claim 12, in combination with a coupling pin, the coupling pin comprising a body portion having a groove therein, wherein the first and second lock walls are configured to seat within the groove, and the body portion is configured to engage with the beams.

14. The connector of claim 1, wherein the first engagement comprises a ring-like connecting portion attached to a portion of the conductive body and a plurality of spaced apart beams cantilevered from the connecting portion, each beam having a first portion extending from the connecting portion and a second portion extending from the first portion, the second portion being angled relative to the first portion.

15. The connector of claim 14, in combination with a coupling pin, the coupling pin comprising a body portion having a groove therein, wherein the first and second lock walls are configured to seat within the groove, and the body portion is configured to engage with the beams.

16. The connector of claim 1, wherein the second engagement comprises a portion of the conductive body that can be crimped to the second electrical component, wherein the portion extends outward from the housing.

17. The connector of claim 16, in combination with wires that are crimped to the portion.

18. The connector of claim 1, further comprising a bridge extending over the first opening, the bridge being connected to the housing proximate to the first opening, the bridge having a wall having an opening therethrough which aligns with the first opening, wherein the wall of the bridge is spaced from the first opening.

19. The connector of claim 18, wherein the opening through the bridge is larger than the first opening.

20. The connector of claim 1, wherein the housing comprises first and second housing parts that are snap fit together.

* * * * *